(12) United States Patent
Wang et al.

(10) Patent No.: US 11,379,029 B2
(45) Date of Patent: *Jul. 5, 2022

(54) USAGE SCENARIO BASED MONITORING AND ADJUSTMENT

(71) Applicant: Intel Corporation, Santa Clara, CA (US)

(72) Inventors: Zhongsheng Wang, Portland, OR (US); James Hermerding, II, Vancouver, WA (US)

(73) Assignee: Intel Corporation, Santa Clara, CA (US)

(*) Notice: Subject to any disclaimer, the term of this patent is extended or adjusted under 35 U.S.C. 154(b) by 11 days.

This patent is subject to a terminal disclaimer.

(21) Appl. No.: 16/707,849

(22) Filed: Dec. 9, 2019

(65) Prior Publication Data

US 2020/0166982 A1 May 28, 2020

Related U.S. Application Data

(63) Continuation of application No. 15/487,550, filed on Apr. 14, 2017, now Pat. No. 10,503,233.

(51) Int. Cl.
*G06F 1/3206* (2019.01)
*G06F 15/78* (2006.01)
(Continued)

(52) U.S. Cl.
CPC ............ *G06F 1/3206* (2013.01); *G06F 1/206* (2013.01); *G06F 1/324* (2013.01); *G06F 9/5083* (2013.01);
(Continued)

(58) Field of Classification Search
CPC ...... G06F 15/76; G06F 15/7807; G06F 1/206; G06F 1/3206; G06F 1/324; G06F 2015/761; G06F 9/5083
See application file for complete search history.

(56) References Cited

U.S. PATENT DOCUMENTS 10,007,555 B1 6/2018 Kuhne
2002/0087611 A1 7/2002 Tanaka et al.
(Continued)

OTHER PUBLICATIONS

United States Patent and Trademark Office, "Corrected Notice of Allowability," issued in connection with U.S. Appl. No. 15/487,550, dated Sep. 20, 2019, 5 pages.
(Continued)

*Primary Examiner* — Terrell S Johnson
(74) *Attorney, Agent, or Firm* — Hanley, Flight & Zimmerman, LLC

(57) ABSTRACT

Methods, apparatus, systems and articles of manufacture are disclosed to monitor and manage usage of resources on a computing platform. An example apparatus includes a processor and a subsystem. The example processor includes a modified operating system, the operating system modified to monitor application execution via the processor to determine a usage scenario for the apparatus. The example processor includes an index generator to generate a system usage scenario index quantifying a snapshot of the usage scenario for the processor and the subsystem of the apparatus. The example processor includes a rebalancer to reallocate resources of at least one of the processor or the subsystem based on the system usage scenario index.

21 Claims, 12 Drawing Sheets

(51) Int. Cl.
G06F 9/50 (2006.01)
G06F 1/20 (2006.01)
G06F 1/324 (2019.01)
G06F 15/76 (2006.01)

(52) U.S. Cl.
CPC .......... *G06F 15/76* (2013.01); *G06F 15/7807* (2013.01); *G06F 2015/761* (2013.01)

(56) References Cited

U.S. PATENT DOCUMENTS

| | | |
|---|---|---|
| 2012/0042312 A1 | 2/2012 | Isci et al. |
| 2012/0110592 A1 | 5/2012 | Shah et al. |
| 2012/0260179 A1 | 10/2012 | Reshadi et al. |
| 2015/0331715 A1* | 11/2015 | Sathyanarayana .... G06F 9/5088 709/226 |
| 2017/0024191 A1* | 1/2017 | Esliger .................... G06F 1/329 |
| 2018/0299940 A1 | 10/2018 | Wang et al. |

OTHER PUBLICATIONS

United States Patent and Trademark Office, "Notice of Allowance," issued in connection with U.S. Appl. No. 15/487,550, dated Jul. 31, 2019, 15 pages.

United States Patent and Trademark Office, "Non-Final Office action," issued in connection with U.S. Appl. No. 15/487,550, dated Jan. 11, 2019, 26 pages.

* cited by examiner

… … …

USAGE SCENARIO BASED MONITORING AND ADJUSTMENT

CROSS-REFERENCE TO RELATED APPLICATIONS

This patent arises as a continuation of U.S. Non-Provisional patent application Ser. No. 15/487,550, which was filed on Apr. 14, 2017. U.S. Non-Provisional patent application Ser. No. 15/487,550 is hereby incorporated herein by reference in its entirety. Priority to U.S. Non-Provisional patent application Ser. No. 15/487,550 is hereby claimed.

FIELD OF THE DISCLOSURE

This disclosure relates generally to computing platform usage monitoring, and, more particularly, to methods and apparatus for usage scenario based monitoring and adjustment of a computing platform.

BACKGROUND

Computing platform resources are readily occupied with a variety of processing tasks. Many applications can make competing demands for processing capability and other platform resources. Configuration of the computing platform can place limitations on the platform's ability to accommodate processing demands at a desired pace.

DETAILED DESCRIPTION

Figure 1:
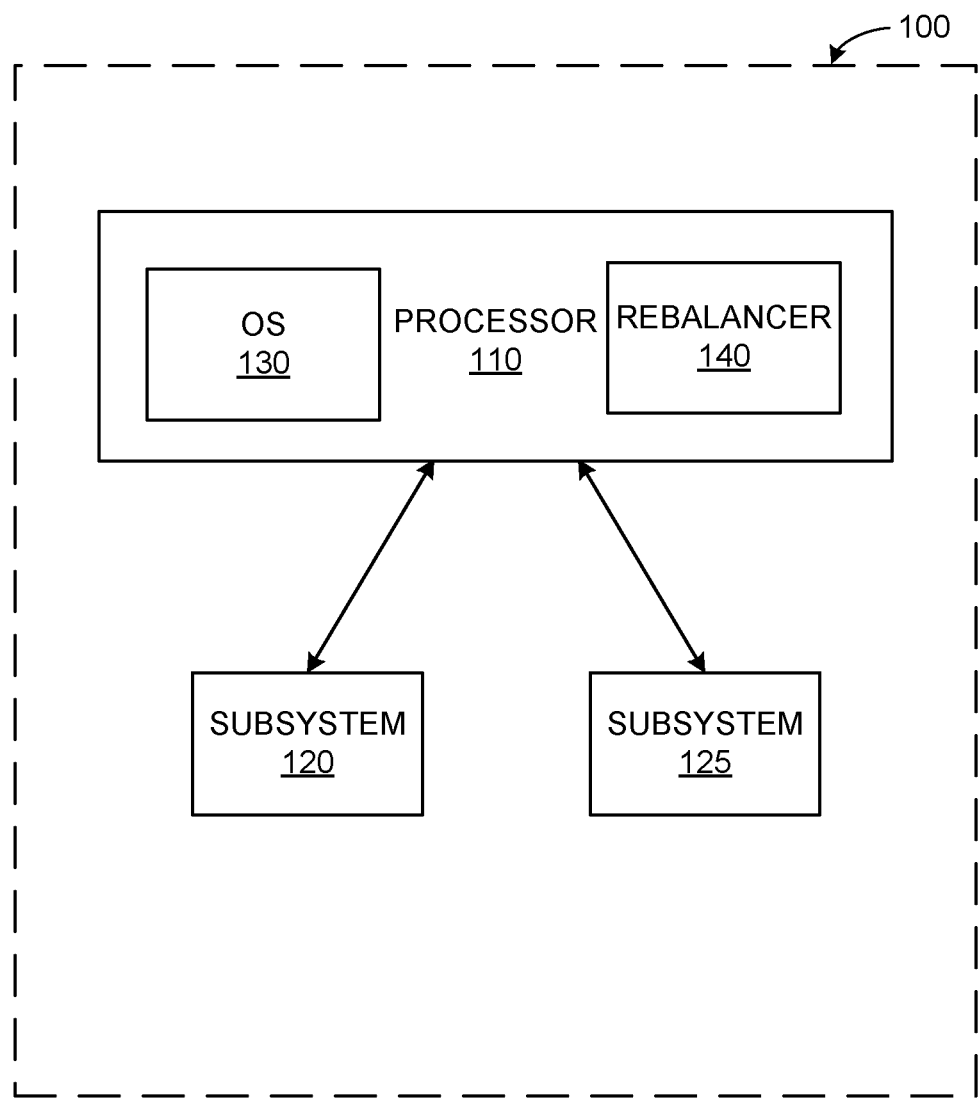
FIG. 1 illustrates a block diagram of an example system or platform including a processor and one or more subsystems.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and/or other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Processors can be designed to execute a variety of applications in a variety of systems such as security, storage, communications, robotics, etc. Different processor architectures provide different levels of performance and energy efficiency depending on its configuration and arrangement with respect to other system components.

In certain examples, a processor can be adapted to run at a speed above a base operating frequency associated with the processor via dynamic control of the processor's clock rate. For example, the processor can be configured to run at a burst frequency for a period of time (e.g., Intel® Turbo Boost Technology, etc.). The faster frequency of processor execution can significantly impact processor performance at runtime. However, speed boost technology reacts to a processor's workload, rather than addressing power and performance at the platform level.

Certain examples described herein facilitate dynamic adjustment of system performance, not just processor speed, based on a system usage scenario. Certain examples provide technology to scale performance at a processor, such as a system on a chip (SOC), etc., as well as the rest of the platform (ROP) providing computing functionality to a system, user, etc.

In certain examples, a system usage scenario is determined. For example, a system usage scenario is defined as a number of active applications and associated telemetry data (e.g., heat generated by a processor and/or other component, data transfer/throughput, network counter value(s), data transfer, other measurable value/metric, etc.) currently executing on a computing platform being monitored. Based on the system usage scenario, a distribution of power and/or other computing resources can be determined and used to adjust system power and performance to accommodate the current system usage scenario.

The present system usage scenario (e.g., a snapshot of system usage at a point in time) can be determined by examining the active applications and telemetry data collected in one or more hardware, software, and/or firmware subsystems of a computing platform. At any given time, the computing platform can have many applications running. Some applications are running in the foreground with user interaction, and other processes are executing in the background on a processor (e.g., SOC, etc.) and/or other platform computing resource. The operating system, such as Windows, Android, Chrome, Linux, etc., understands which applications are active and which applications are executing in the foreground and/or background.

A system usage scenario can be represented as a numerical value or series/set of numerical values such as an index, for example. The index (e.g., a system usage scenario index and/or other scenario index, usage index, etc.) can be used to quantify a snapshot of current system component usage and/or activity, for example. The system usage scenario index (SUSI) calculation can consider both foreground and background processes, for example. However, in certain examples, a foreground application has a higher weight than a background processes in the SUSI calculation. Additionally, the operating system (OS) can collect telemetry data from each subsystem, such as a video subsystem, audio subsystem, display subsystem, WiFi subsystem, a wireless wide area network (WWAN) subsystem, etc., to provide a better understanding of the usage scenario.

The SUSI can change for a variety of reasons (e.g., when a user has switched to a different application, a background task has finished, etc.). In certain examples, the SUSI can be compared to a predefined threshold, range, etc. One or more processes can subscribe and/or otherwise register to receive notifications regarding the SUSI. When the change of SUSI exceeds a predefined threshold or is outside a predetermined range, for example, the OS sends a notification event to process(es) that have registered for the event. For example, a processing platform such as Intel's® Dynamic Platform and Thermal Framework (DPTF), ARM Intelligent Power Allocation, etc., can generate and/or subscribe to notification regarding the SUSI and leverage the SUSI for power and resource management.

FIG. 1 illustrates a block diagram illustrating an example system or platform 100 including a processor (e.g., a central processing unit (CPU), system-on-a-chip (SOC), other platform processor, etc.) 110 and one or more subsystems 120, 125 (e.g., the "rest of the platform" (ROP) such as memory and/or other data storage, display, camera, modem and/or other communication interface, cooling device, etc.). As illustrated in the example of FIG. 1, the processor 110 includes an operating system (OS) 130 and a rebalancer 140.

The OS 130 interacts with the subsystem(s) 120, 125 and determines electronic activity (e.g., processing, motor operation, communication, etc.), executing application(s) (e.g., foreground processes, background processes, other computing instruction tasks, etc.). The OS 130 also monitors application and/or other process (e.g., services, computing tasks, etc.) execution by the processor 110. Alternatively or in addition, the OS 130 can gather resource utilization information (e.g., processor 110 utilization, performance information, bandwidth utilization, power consumption, other operational and/or telemetry data, etc.) from the processor 110 and/or subsystem(s) 120, 125. For example, the OS 130 facilitates execution and/or monitors execution of processes, services, etc., and can gather information regarding resource utilization in communication with the processor 110 and/or subsystem(s) 120, 125.

The OS 130 provides information gathered regarding executing application(s) and/or other process(es), resource utilization, etc., to the rebalancer 140. The example rebalancer 140 rebalances and/or otherwise reallocates system resources and/or configuration settings based on a determination of usage and environmental settings (e.g., temperature, power consumption, etc.). System usage can be calculated as an index (e.g., a SUSI, etc.) based on the determined usage and/or other environmental settings. In certain examples, the OS 130 is modified to provide the index. In certain examples, some usage information can be given priority and/or weighted higher than other information. For example, executing foreground applications can be given higher weight than background processes. Based on application/process and/or resource telemetry information, the usage index and/or other usage measure can be dynamically calculated and can change as different application(s) are executed, background process(es) complete, different functionality is activated in the platform 100, etc.

In certain examples, the platform 100 executes one or more processes according to a default or initial resource allocation. For example, a certain percentage of power, memory, processing power, etc., is allocated to tasks executing via the processor 110 versus the rest of the platform (e.g., subsystem(s) 120, 125, etc.). The OS 130 monitors application execution and/or resource utilization information, for example, and the OS 130 and/or rebalancer 140 dynamically calculates the SUSI and/or other measure of system usage.

The OS 130 and/or rebalancer 140 compares the SUSI and/or other measure to a threshold. If the SUSI and/or other measure exceeds and/or otherwise does not satisfy the threshold, then the rebalancer 140 is triggered to rebalance platform 100 resources based on the updated index. In certain examples, the rebalancer 140 provides allocation information, instructions, and/or "hints" (e.g., suggestion, recommendation, information for the subsystem 120, 125 to determine its own configuration, etc.) to the processor 110 (e.g., a CPU, SOC, etc.) and the ROP (e.g., the subsystem(s) 120, 125, etc.).

Figure 2:
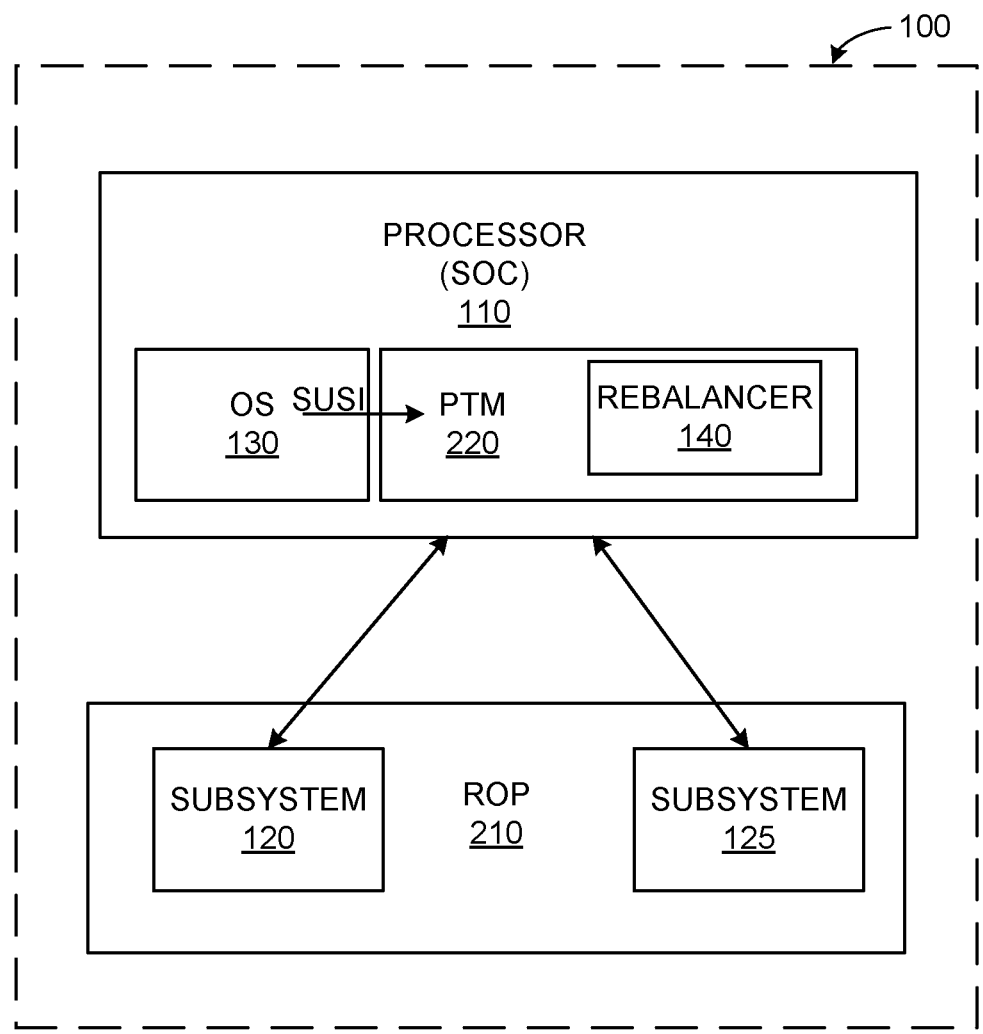
FIG. 2 illustrates an example configuration of the platform of FIG. 1 divided between a processor and the rest of the platform (ROP)

FIG. 2 illustrates an example configuration of the platform 100 divided between the processor or SOC 110 and the rest of the platform (ROP) 210. As shown in the example of FIG. 2, the processor 110 is implemented as a system-on-a-chip (SOC) and includes the OS 130 and rebalancer 140, as well as a power and thermal manager (PTM) 220. In certain examples, the PTM 220 is implemented as an Intel® DPTF power and thermal management platform solution that utilizes hardware and software to coordinate policies for the hardware state of a computing device. The DPTF and/or other power/thermal management device acts as a container of multiple power and thermal technologies. The example ROP 210 includes subsystems 120, 125. In the example of FIG. 2, the rebalancer 140 is included in the PTM 220, which leverages hardware and software to coordinate policies governing power and thermal activities of the platform 100 including the SOC 110 and the ROP 210.

The PTM 220 receives the SUSI from the OS 130 and processes the index to derive a suggestion or hint for the SOC 110 and the ROP 210. For example, the SUSI can be a composite index including a number or other value for each process, resource, etc., that has been monitored and analyzed by the OS 130. The PTM 220 and its rebalancer 140 can dissect the SUSI and compare individual process/resource values to determine which process, resource, etc., has a high priority. The PTM 220 and rebalancer 140 can then suggest a prioritization or change in configuration, resource allocation, etc., between the SOC 110 and ROP 210 based on the relative index values, for example. The SOC 110 and ROP 210 can adjust their internal power in response to the suggestion output by the rebalancer 140. Once a determination has been made, the OS 130 continues to monitor application execution, telemetry data, etc., and can re-evaluate the SUSI to indicate a change in platform 100 operation triggering a rebalancing of resources, for example.

Thus, the OS 130 can collect data regarding executing processes, subsystems, etc., and transmit the collected data to the processor 110. For example, the OS 130 can generate application profile(s) based on executing application(s) and subsystem(s) 120, 125 involved in executing the application(s) (e.g., video subsystem, image capture, image processing, CPU, WiFi, modem, data storage, etc.). Each subsystem 120, 125 has telemetry information that can be used to build a profile. The profile can be used to build an index, such as the SUSI, etc.

In certain examples, each subsystem 120, 125 has an index number. The index number can be represented as a number of bits (e.g., 4 bits, 8 bits, etc.). The bit value indicates how busy (e.g., how many resources, how much of a resource, etc.) the subsystem 120, 125 is at the time of measurement and/or other determination. Index values for multiple subsystems 120, 125 and the processor 110 can be combined into a composite index such as the SUSI, etc. Thus, a 32-bit or 64-bit value, etc., can provide an aggregate indicator of platform 100 activity and provide subranges for individual components. The index can be formed from telemetry data collected by the OS 130, a measure of active applications provided by the OS 130, and/or other metric for measurement of resource usage for the platform 100 (e.g., the SOC 110 and the ROP 210).

The processor 110 can dynamically adjust each subsystem 120, 125 to better allocate resources to applications currently running. In the example of FIG. 2, the PTM 220 intercepts the information from the OS 130 and determines which information is related to processor 110 and which information is related to each subsystem 120, 125 (e.g., wireless interface, camera, storage, display, etc.). The PTM 220 can distribute information to the relevant component 110, 120, 125 and facilitate adjustment of performance of that component 110, 120, 125, for example.

For example, if the platform 100 is being used for gaming, the OS 130 can determine to boost WiFi performance for the game and enhance graphics on a graphics processing unit (GPU) so the CPU 110 does not use as much power. The PTM 220 can facilitate that adjustment. In certain examples, the system 100 can operate according to a certain base, default, or initial state, which is then adjusted based on an analysis of the SUSI. Resources, such as power, frequency, bandwidth, etc., can be adjusted based on a particular application and/or usage profile and/or dynamically determined based on the usage index information, etc.

Figure 3:
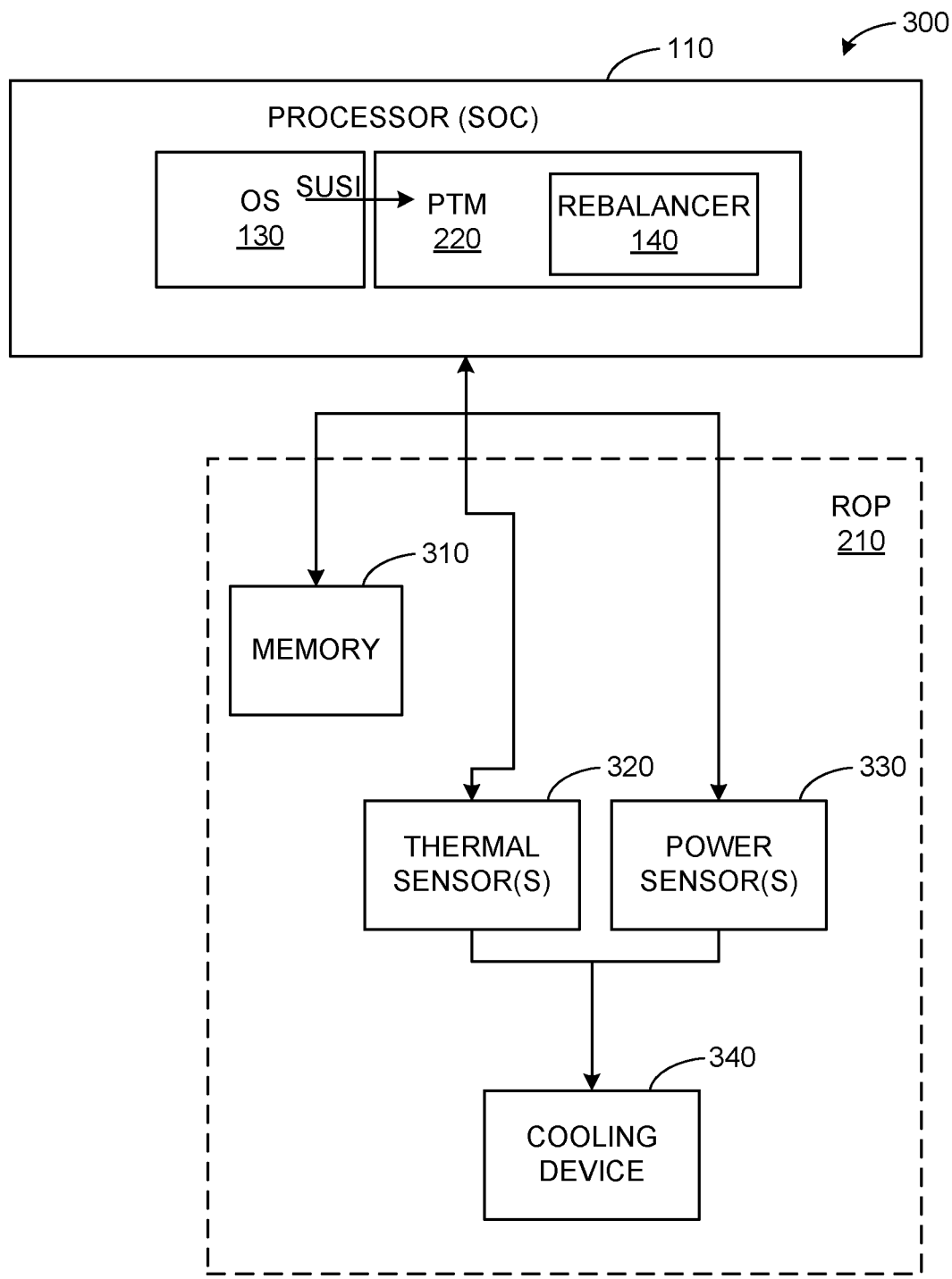
FIG. 3 illustrates an example platform including the example processor of FIGS. 1 and 2 implemented with a power and thermal management.

FIG. 3 illustrates an example implementation 300 of the platform including the SOC 110 and the ROP 210. The example platform 300 includes the PTM device 220 forming a closed loop to manage thermal and/or power characteristics of the platform 300 components in a constrained design. The PTM device 230 includes and/or operates with the processor 110 and the OS 130 to communicate with the ROP 210. The example ROP 210 of FIG. 3 includes a memory 310, one or more thermal sensors 320, and one or more power sensors 330. The thermal sensor(s) 320 and power sensor(s) 330 are connected to a cooling device 340. The thermal sensor(s) 320 (e.g., an on-die thermal diode, thermocouple, and/or other sensor to monitor operating temperature, etc.) and power sensor(s) 340 (e.g., Intel® Power Gadget, Intel® Power Checker, Joulemeter, and/or other power information sensor, etc.) provide configuration and power interface parameters for the platform 300 to the PTM device 220, for example.

In operation, the processor 110 increases frequency in response to sensor and application information, for example. When increasing the processor 110 operating frequency above its base frequency, the increase in frequency is limited by a maximum frequency and available power. The processor 110 of the PTM device 220 can raise or lower available power and/or raise or lower operating frequency to keep temperature and performance of the platform 300 within defined limits.

The example PTM 220 can be implemented using a plurality of software (e.g., Linux, UNIX, etc.) modules. For example, Eco-System Independent Framework (ESIF) Linux kernel modules can form a bottom layer of the PTM 220 to interact with an upper ESIF layer as well as a Basic Input/Output System (BIOS) of systems on the platform 300. The upper ESIF layer is a user space application that provides an ESIF shell environment, allowing users to issue ESIF commands (e.g., start an application in an active user session, etc.) directly to system BIOS, and/or load policies from the PTM 220, for example. Shared libraries form polices for the PTM 220 in a top layer that can be loaded through the ESIF shell. These layers together form the PTM package which leverages firmware support (e.g., BIOS, embedded controller, etc.) to operate.

In certain examples, the ESIF implements platform 300 and operating system agnostic capabilities for the PTM device 220. The ESIF facilitates hosting of users and/or applications and provides one or more interfaces for presentation layer(s) (e.g., HTML-5, etc.) as well as kernel drivers for thermal status reporting, control adjustment, etc. Policies provided by the PTM device 220 attempt to effect control "knobs" or interface specifications to adjust characteristics and/or other parameters of platform 300 components such as the platform processor 110 (e.g., the SOC/CPU, etc.), memory 310, cooling device 340, etc.

In certain examples, the PTM 220 reacts to an input to adjust power and resource allocation and/or usage for the platform 300 (e.g., by processing the SUSI, other system usage indictor, etc.). In certain examples, the PTM 220 both generates and processes the SUSI. In other examples, the PTM 220 receives the SUSI from another processor and then processes the SUSI. Based on the information gathered in the SUSI, as well as information regarding the platform 300, the PTM 220 triggers the rebalance 140 to rebalance power between the SOC 110 and the ROP 210. The PTM 220 then provides a hint to the SOC 110 and any local subsystem power arbitrator on the ROP 210. The hint is derived by the rebalancer 140 from the SUSI and includes information such as a type of usage, component(s) involved, priority, etc. The SOC 110 and other power arbitrator adjust their internal power in response to the hint. This monitoring and adjustment can be repeated to provide a better usage experience when power is limited and/or a temperature threshold is exceeded and better performance when power is unlimited and/or temperature threshold is not exceeded, for example.

Figure 4:
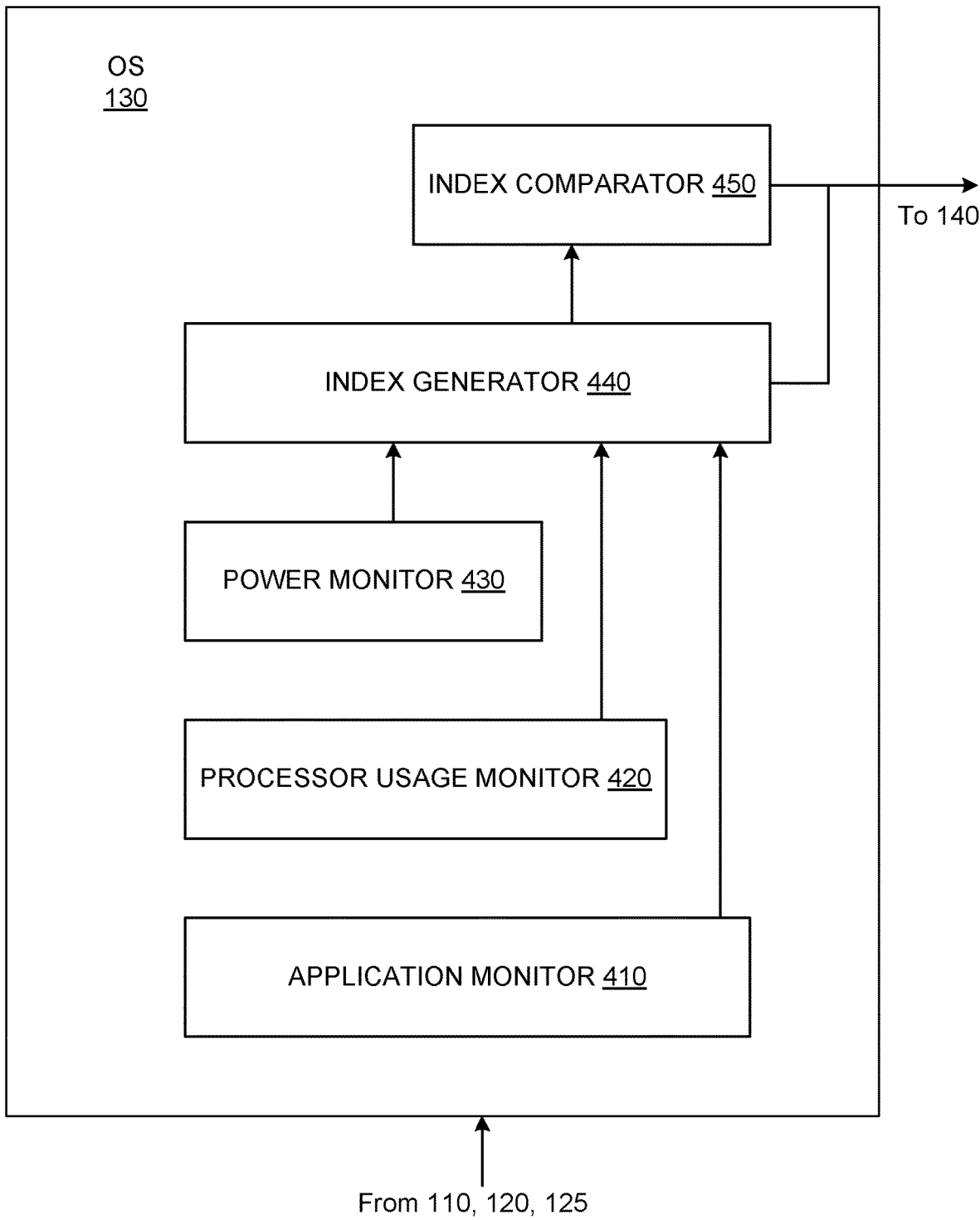
FIG. 4 illustrates a block diagram of an example implementation of an operating system described in connection with FIGS. 1-3.

FIG. 4 illustrates a block diagram of an example implementation of the operating system (OS) 130 described in connection with FIGS. 1-3 above. As shown in the example of FIG. 4, the OS 130 includes an application monitor 410, a processor usage monitor 420, a power monitor 430, an index generator 440, and an index comparator 450.

In the example OS 130 of FIG. 4, the application monitor 410 receives information regarding applications and/or other processes executing with respect to the processor 110 and/or subsystem 120, 125, etc. The application monitor 410 can identify an executing application/process as well as resource(s) (e.g., processor 110, subsystem 120, 125, etc.) involved in executing the application/process. The application monitor 410 provides the executing application and/or other process information to the index generator 440.

The processor usage monitor 420 receives usage information regarding the processor 110 (e.g., the SOC). The processor usage monitor 420 processes the processor 110 usage information to determine a processor 110 activity and/or idle state. The processor usage monitor 420 can determine a percentage of processor 110 usage represented by a current system state, for example. The processor usage monitor 420 can also determine memory and/or other resource access by the processor 110, for example. The processor usage monitor 420 can obtain processor 110 usage information from the processor 110, OS 130, and/or other monitor of processor 110 activity, for example. The processor usage monitor 420 provides the processor 110 usage information to the index generator 440.

The power monitor 430 monitors power consumption by the platform 100, 300. The power monitor 430 receives power consumption information from the processor 110, subsystem 120, 125, and/or other sensor or monitor of power consumption. For example, the power monitor 430 can receive power consumption information from the power sensor(s) 330. In certain examples, the power monitor 430 receives temperature information regarding the processor 110, subsystem 120, 125, etc., such as from the thermal sensor(s) 320.

As shown in the example of FIG. 4, output from the application monitor 410, processor usage monitor 420, and power monitor 430 is provided to the index generator 440 to generate a scenario index (e.g., SUSI, etc.) and/or other value representing a usage scenario for the platform 100, 300. The information can be provided for each component (e.g., SOC 110, ROP 210, processor 110, subsystem 120, 125, etc.) being monitored. The index generator 440 represent each monitored component with an index value. For example, the index value for each monitored component is formed from a defined number of bits (e.g., 2 bits, 4 bits, 8 bits, 16 bits, etc.).

The index value provides an absolute or relative measure of the activity of the monitored component. The index value can be calculated from data measured at a particular point in time and/or a set of data values gathered over a time period and aggregated to determine the index value. The index value can be determined by the index generator 440 according to a particular system operating profile or mode (e.g., gaming, teleconference, video editing, etc.) and/or can determine the index value dynamically based on a comparative analysis of data from the components being monitored, for example. Example SUSI determinations are described below.

The index generator 440 can combine index values for multiple subsystems 120, 125 and the processor 110 into a composite index such as the SUSI and/or other scenario/usage index, etc. Thus, a 32-bit or 64-bit value, etc., can provide an aggregate indicator of platform 100, 300 activity and provide subranges for individual components.

In certain examples, such as the example of FIG. 4, the OS 130 includes an index comparator 450. The index comparator 450 compares the individual and/or composite scenario index values to one or more criteria (e.g., one or more thresholds, ranges, prior value(s), etc.), to determine whether the individual and/or composite index value(s) have changed (e.g., greater or less than a defined threshold, outside or inside a range, different from prior determined value(s), etc.) to trigger an update.

If the index comparator 450 determines that the scenario index(es) provided by the index generator 430 trigger an update, the index comparator 450 generates an instruction for the rebalancer 140 to rebalance and/or otherwise reallocate power level(s), resource(s), etc., based on the scenario index. For example, if an update is triggered and the platform 100, 300 is determined to be used primarily for gaming at the time of scenario index determination, the rebalancer 140 is instructed, via a trigger input, to allocate more power to components involved in game play and less power to components not being used for the game play based on the scenario index.

In certain examples, the index comparator 450 is located in the PTM 220 and/or the rebalancer 140 instead of the OS 130. In such examples, the OS 130 generates the scenario index(es) (e.g., the SUSI, etc.) and transmits the index to the PTM 220 and/or rebalancer 140, at which the index comparator 450 analyzes the received index(es) to determine whether a rebalancing is warranted.

Figure 5:
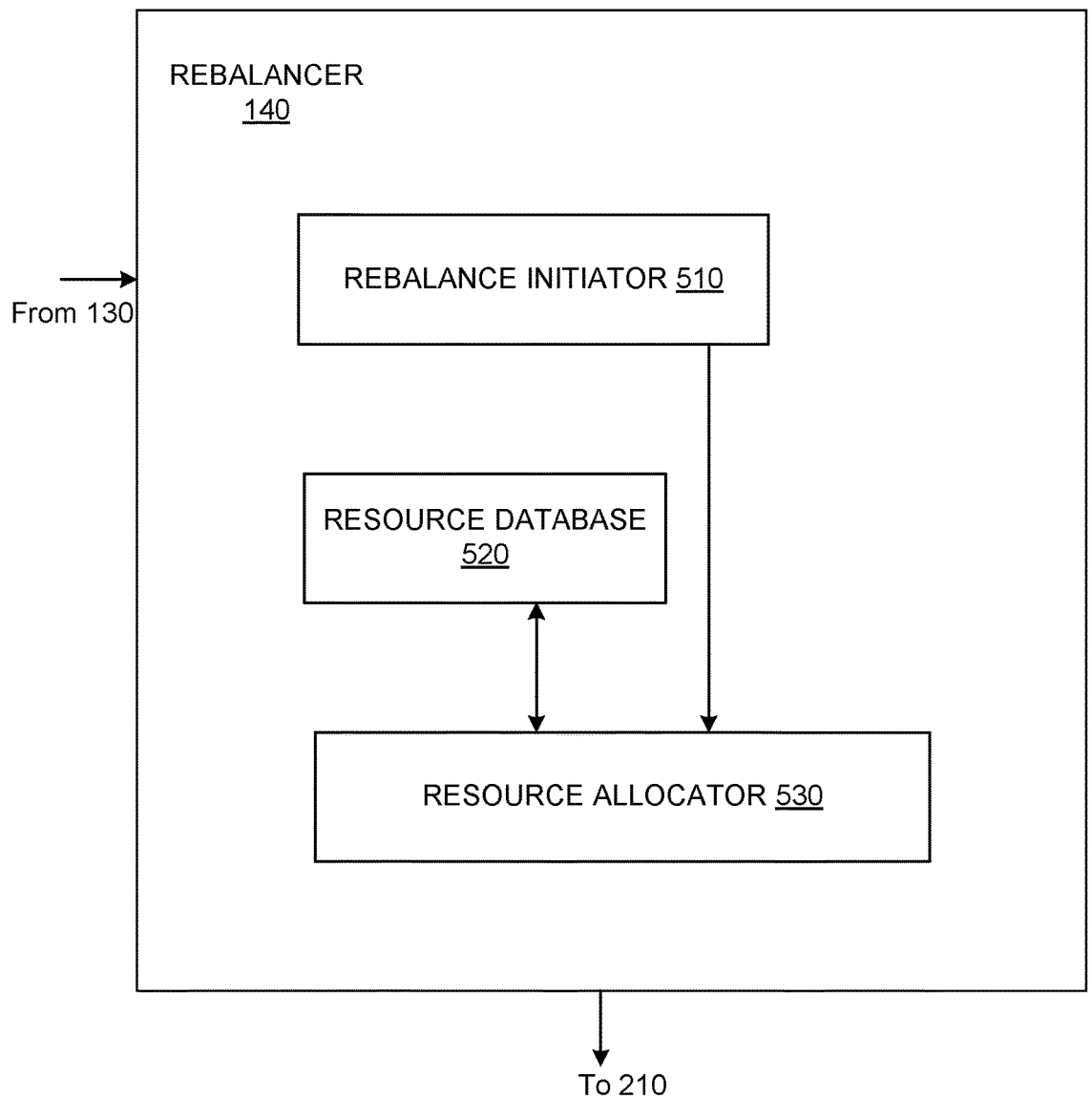
FIG. 5 illustrates a block diagram of an example implementation of a rebalancer described in connection with FIGS. 1-3.

FIG. 5 illustrates a block diagram of an example implementation of the rebalancer 140 described in connection with FIGS. 1-3 above. As shown in the example of FIG. 5, the rebalancer 140 includes a rebalance initiator 510, a resource database 520, and a resource allocator 530.

The example rebalance initiator 510 receives a trigger input from the OS 130 to trigger rebalancing of resources on the platform 100, 300. For example, a trigger input, such as the scenario index(es) and an indication or trigger for rebalancing, is provided by the index generator 440 and index comparator 450 to the rebalance initiator 510. Receipt of the trigger input activates the rebalance initiator 510 to provide a hint, suggestion, and/or instruction for rebalancing to the SOC 110 and ROP 210 of the platform 100, 300.

The rebalance initiator 510 relays the trigger input to the resource allocator 530. The resource allocator 530 processes the scenario index(es) to identify the information represented by the index bit value(s). The resource allocator 530 can leverage the resource database 520, which includes information regarding the processor 110, subsystem(s) 120, 125, and other components of the platform 100, 300. Resource information from the database 520 helps the resource allocator 530 determine which resource(s) should be rebalanced and/or how the resource(s) should be rebalanced, for example.

In certain examples, the resource allocator 530 of the rebalancer 140 provides instruction(s) to the SOC 110 and/or ROP 210 regarding resource reallocation (e.g., power consumption, processor utilization, memory utilization, communication bandwidth, etc.). In certain examples, the resource allocator 530 provides hint(s) or recommendation(s) suggesting to the SOC 110 and/or ROP 210 that an adjustment occur.

Thus, the resource allocator 530 examines the scenario index information and, in some examples, other database 520 information, and determines a rebalancing of resources and/or configuration settings for the platform 100, 300. The rebalancing can occur between the SOC 110 and the ROP 210, and/or within the SOC 110, ROP 210, etc.

In certain examples, a subsystem 120, 125 can be assigned a threshold associated with resource utilization. Once monitored utilization, as represented by the index value, exceeds the threshold, a hint, suggestion, and/or instruction can be generated to rebalance resources for the subsystem 120, 125. For example, a subsystem 120, 125 can be associated with a threshold of X % utilization (e.g., 75%, 80%, 90%, etc.) of subsystem 120, 125 resources. When the utilization of the subsystem 120, 125 exceeds the threshold (e.g., 80%, 90%, 100%, etc.), the rebalancer 140 is triggered to rebalance resources in favor of that subsystem 120, 125, for example.

In other examples, the index generator 440 generates an index indicative of an operating mode of the platform 100, 300, and the index comparator 450 identifies the change in mode. Thus, for example, usage of audio at X %, wireless communication at Y %, and a graphics subsystem at Z % indicates that video is being streamed for a video call (e.g., Skype®, etc.). The resource allocator 530 leverages the database 520 to retrieve and implement a system resources profile for the SOC 110 and ROP 210 to fit the identified system usage scenario, for example.

Figure 6:
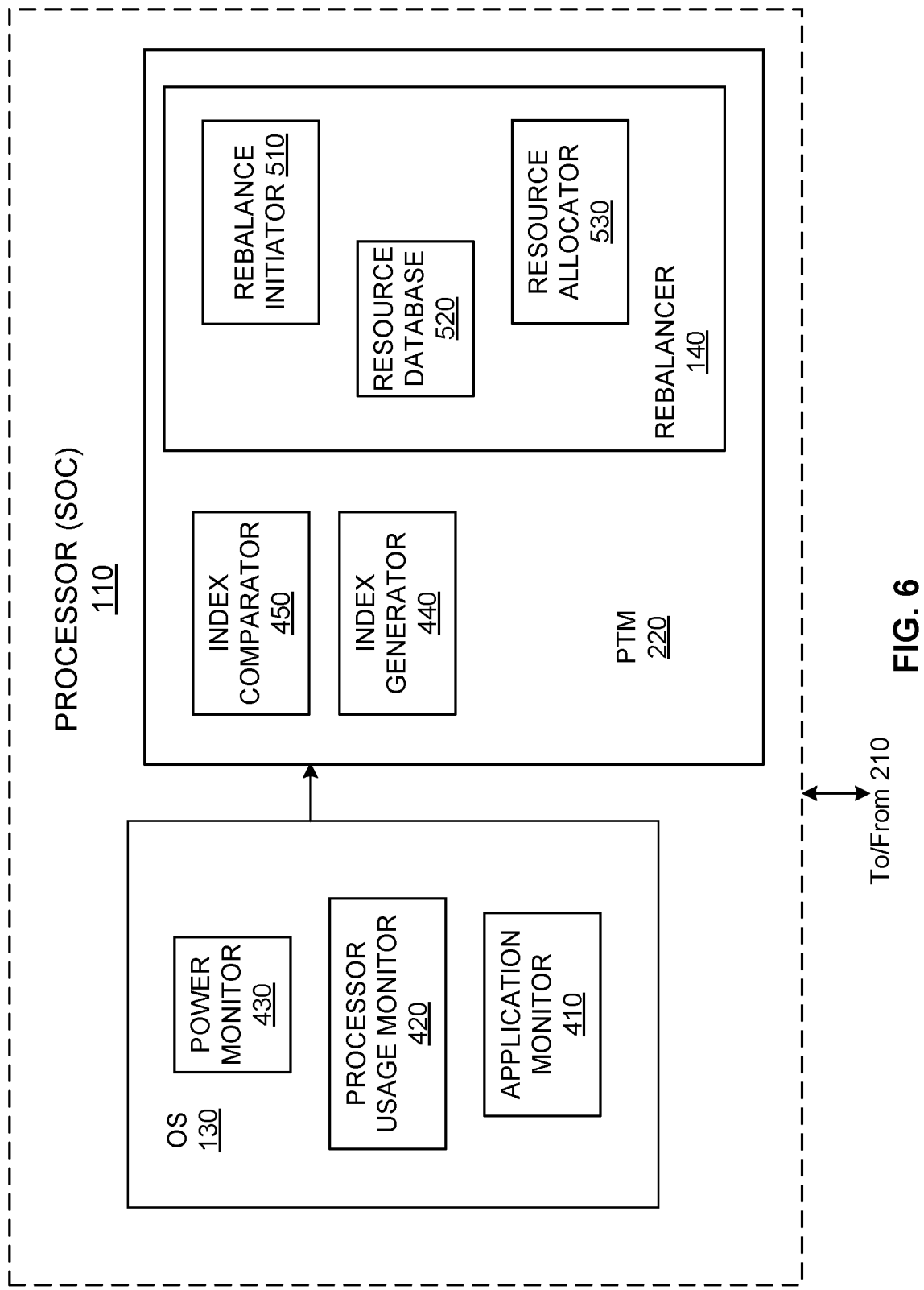
FIG. 6 illustrates a block diagram of an alternative example implementation of the devices of FIG. 4-5.

FIG. 6 illustrates a block diagram of an alternative example implementation in which the index generator 440 and index comparator 450 are provided in the PTM 220, and the PTM 220 provides an instruction to the rebalancer 140. As discussed above, the application monitor 410, processor usage monitor 420, and power monitor 430 provide input to the index generator 440. Based on the input, the index generator forms a scenario index (e.g., SUSI, etc.) and/or one or more sub-index values that can stand alone and/or combine to form the scenario index. The index comparator 450 compares the index value(s) to one or more criteria (e.g., threshold, range, profile, etc.) to generate a trigger input for the rebalance initiator 510. The rebalance initiator 510 passes index information to the resource allocator 550, which leverages a resource database 540 of configuration and/or other parameter/setting information to generate one or more instructions, hints, suggestions, etc., for rebalancing power and/or other resources among the SOC 110 and all or part of the ROP 210, for example.

Figure 7:
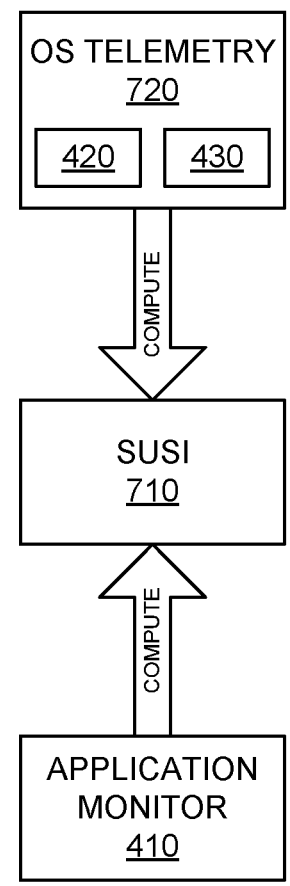
FIG. 7 illustrates an example scenario index formed using application and/or telemetry information.

FIG. 7 illustrates an example SUSI 710 formed using information from the application monitor 410 and/or OS telemetry data 720. The telemetry data 720 can include processor usage monitor 420 data, power monitor 430 data, and/or other platform 100, 300 resource data from the SOC 110, ROP 210, etc. The processor 110 and OS 130 work to compute the SUSI 710 based on the telemetry and application data, such as foreground applications executing, background applications executing, platform 100, 300 components involved, platform 100, 300 mode/profile, etc.

Figure 8:
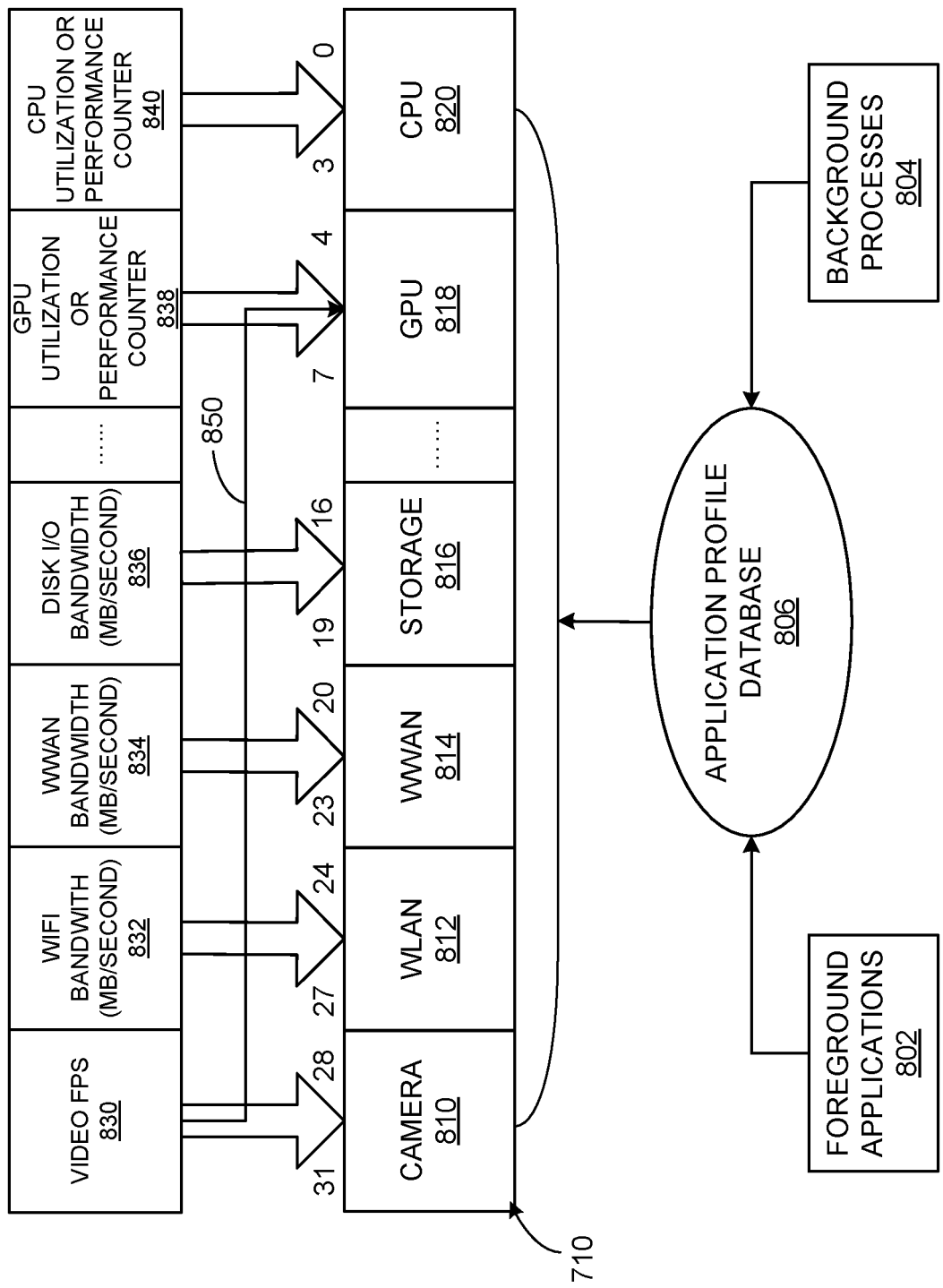
FIG. 8 shows an example system usage scenario index including individual index values and system inputs.

As illustrated in the example of FIG. 8, the SUSI 710 can be formed using information regarding foreground applications 802 and background processes 804 matched by the index generator 440 according to application profile database 806 information (e.g., matched by the index generator against the application profile database 806, etc.). As shown in the example of FIG. 8, the overall scenario index represented by the SUSI 710 is divided into individual index or sub-index values 810-820.

For example, as shown in the particular use case of FIG. 8, individual or sub-index values 810-820 can be associated with a camera subsystem 810, a wireless local area network (WLAN) subsystem 812, a wireless wide area network (WWAN) subsystem 814, a storage subsystem 816, a GPU 818, a CPU 820, etc. In the example of FIG. 8, each index value 810-820 is assigned 4 bits per subsystem, although that number can vary (e.g., 2 bits, 8 bits, 16 bits, etc.). In the example of FIG. 8, the overall SUSI 710 is then represented by a 32-bit value formed from 6 individual 4-bit sub-index values. For example, as shown in FIG. 8, an indication of video frames per second (FPS) 830 is provided as telemetry data to shape the sub-index value for the camera subsystem 810. Wireless communication (e.g., WiFi, etc.) bandwidth 832 (e.g., in megabytes per second, kilobytes per second, bytes per second, megabits per second, kilobits per second, bits per second, etc.) is provided as telemetry data for the WLAN subsystem 812. WWAN bandwidth 834 is provided as telemetry data forming the sub-index value for the WWAN subsystem 814. Disk input/output (I/O) bandwidth 836 is provided as telemetry data to form the sub-index value for the storage subsystem 816. A GPU utilization and/or performance counter 838 provides input to form the sub-index value for the GPU 818. A CPU utilization and/or performance counter 840 provides input to form the sub-index value for the CPU 820.

In certain examples, using the application profile 806, certain telemetry and/or application information can be tied to more than one sub-index value. For example, as shown in FIG. 8, the video FPS data 830 relates to the camera subsystem 810 index value and also ties in to usage of the graphics processing unit (GPU) 818.

Thus, each sub-index value defines a usage level of the respective subsystem 810-820 to indicate how busy the subsystem is at the moment of measurement. The higher value for each subsystem 810-820 indicates a higher usage level for the subsystem. Many subsystems can be described in a composite 32-bit or 64 bit value, for example, forming an overall scenario index or SUSI. In certain examples, a number of subsystems reflected in the SUSI 710 can depend on one or more factors including resource availability, profile, interest, system design, etc. If it is beneficial to control power and performance for more devices, more subsystems can be defined.

As described above, the SUSI 710 can be computed in one or more ways. In one approach, the SUSI is computed using telemetry data 720 for each subsystem in the OS 130. The subsystem telemetry data 720 varies among subsystems. For example, the CPU SUSI value 820 can be generated based on the CPU utilization percentage or certain performance counter 840. A range of CPU utilization (e.g., 0-100%) or performance counter can be divided into 16 steps, for example. When the CPU utilization or performance counter increases by 1 step size, the CPU SUSI value 820 increases by 1 and so on. The same concept can be used for other subsystem index values 810-818. In some examples, rather than using a utilization percentage, other subsystems can use bandwidth data, frame-per-second, etc., to compute the respective SUSI 810-820.

In certain examples, the SUSI can be computed based on information regarding active applications executing on all or part of the platform 100, 300. For example, if the OS 130 does not support the dynamic collection and application of telemetry data 720, applications can be pre-profiled using OS telemetry data collection. Each application profile describes the subsystem usage for the application. For example, a gaming application can involve CPU, GPU, camera, and WiFi (e.g., online game) subsystems. The usage level 810, 812, 818, 820 for each subsystem can be measured (e.g., by executing a corresponding application in a lab or other monitored setup, etc.) and/or estimated (e.g., based on vendor input, etc.) using the application monitor 410 (e.g., executing in the OS 130, PTM 220, etc.). A resulting application profile can be saved in the application profile database 806 located in the cloud and/or on the local system 100, 300.

The application monitor 410 monitors active applications on the system 100, 300. When an application is launched, the profile for the application is retrieved (e.g., from the database 806). The application monitor 410 sums a usage level for each subsystem for all executing applications. If the calculated usage level is greater than a maximum value, then a maximum usage level is assigned to that subsystem. For example, if each subsystem's index value has 4 bits, the maximum usage level is 16. A value exceeding the maximum of 16 is given the maximum usage level of 16 as its value.

In certain examples, both telemetry data and application profile information can be combined to produce a sub-index value using a scaling factor. In certain examples, the SUSI 710 calculated from the telemetry data 720 is given more weight than the application profile-generated value (e.g., 4:1, 3:1, 2:1, etc.).

The impact of the SUSI 710 determination on platform 100, 300 operation between the SOC 110 and ROP 210 is further illustrated through the following example use cases.

For example, in a gaming use case, a user is playing an online video gaming application. The OS 130 calculates the SUSI 710 based on the name of the gaming application (e.g., Microsoft Halo™, etc.) as well as telemetry information 720 collected in the video subsystem 830, the WiFi subsystem 832, etc. Activities observed in the video subsystem 830 indicate that the game is relying heavily on the GPU. Activities in the wireless subsystem 832 indicate that user is playing the game online. An example SUSI 710 can be represented as:

| Camera | WLAN | WWAN | Storage | Audio | Display | GPU | CPU |
|---|---|---|---|---|---|---|---|
| 0 | 10 | 0 | 5 | 5 | 6 | 16 | 14 |

When the OS 130 has calculated the SUSI 710, the OS 130 sends a notification (e.g., a notification event to registered component(s), process(es), etc.) of the SUSI 710. For example, the PTM 220 receives a notification from the OS 130 regarding the SUSI 710. The PPTM 220 and its rebalancer 140 rebalances power for the SOC 110 and a WiFi device subsystem 120, 125 in the ROP 210. The PTM 220 sends a hint/suggestion to the SOC 110 via a predefined register interface, for example, and the performance state of affected device(s) can be altered to boost performance. The SOC 110 rebalances the power internally for graphics and integrated connectivity modules, for example. If a discrete graphics card is used, the PTM 220 and SOC 110 can make an adjustment in power rebalance to provide the user with an improved gaming experience through improved system 100, 300 operation. For example, if a discrete graphics card is used, the rebalancer 140 can remove or reduce the usage level for the GPU since the dedicated, discrete graphics card will be used more than the GPU for game play.

Thus, the PTM 220 and its rebalancer 140 can set maximum power for the SOC 110 and send the following modified SUSI to the SOC 110 via a predefined register interface:

| Camera | WLAN | WWAN | Storage | Audio | Display | GPU | CPU |
|---|---|---|---|---|---|---|---|
| 0 | 10 | 0 | 0 | 5 | 6 | 2 | 14 |

In this example, the storage SUSI index value 816 is reduced to 0 since the SOC 110 does not manage the storage device power and performance. The GPU SUSI index value 818 is reduced to 2 because the graphics rendering is done by the discrete graphics device rather than the GPU. The integrated graphics device can be used for display depending on how the hybrid graphics is configured in the system 100, 300. The SOC 110 rebalances the power for CPU, integrated graphics, and integrated connectivity modules accordingly based on the power budget that has been allocated by the PTM 220, for example, to provide a better gaming experience to the user.

When the intensity of the gaming operation is reduced, the SUSI 710 for the active subsystems 120, 125 is reduced as well. For example, the SUSI 710 is adjusted to:

| Camera | WLAN | WWAN | Storage | Audio | Display | GPU | CPU |
|---|---|---|---|---|---|---|---|
| 0 | 3 | 0 | 1 | 5 | 6 | 2 | 5 |

With the adjusted SUSI 710, the PTM 220 reduces the power budget to the SOC 110, the discrete graphics, and WLAN devices. Since the GPU SUSI index 818 is then very low, it is expected that discrete graphics will not be used heavily. In this case, the power to discrete graphics can be significant reduced or even removed. If a high performance power option is used, which is typical for a gaming machine, the OS 130 does not automatically reduce the power to devices. Therefore, the PTM 220 can dynamically adjust power budget for each device. Such dynamic power adjustment based on the SUSI 710 can save battery life significantly.

Another example provides a teleconference use case. In this example, a user is attending a video conference via a video chat and/or voice call service. The OS 130 calculates the SUSI 710 based on the active application name (e.g., Skype™, etc.) as well as telemetry information collected in the video subsystem, the camera subsystem, the WiFi subsystem, etc. The OS 130 determines that platform 100, 300 is operating according to a camera-centric online conference usage scenario. For example, the SUSI 710 can include:

| Camera | WLAN | WWAN | Storage | Audio | Display | GPU | CPU |
|---|---|---|---|---|---|---|---|
| 14 | 13 | 0 | 6 | 5 | 6 | 10 | 6 |

The SUSI 710 is sent to the PTM 220. The PTM 220 interprets the index 710 and decides to allow more power to the camera device and WIFI device as subsystems 120, 125 of the platform 100, 300. That is, since the system 100, 300 in this example does not include a discrete graphics card, the PTM 220 sets a power budget to the SOC 110 and sends the SUSI 710 to the SOC 110.

For example, the PTM 220 sends a hint to the SOC 110 indicating that the system usage scenario is a camera usage. The SOC 110 interprets the usage model as an online conference due to heavy usage of the camera and GPU and balances power between the imaging process module and other available modules (e.g., by allocating more power to the GPU imaging unit and integrated connectivity module, as well as allocating power budget to the camera and WLAN devices to maintain high video quality, etc.). The rebalancing provides the user with a much smoother video conference experience.

Another example provides a video editing use case. In this example, a user is making a movie on his/her laptop. The OS 130 senses heavy CPU, GPU, and storage usage on the system 100, 300. A SUSI 710 is generated by the OS 130. For example, the SUSI 710 can be represented as:

| Camera | WLAN | WWAN | Storage | Audio | Display | GPU | CPU |
|---|---|---|---|---|---|---|---|
| 0 | 0 | 0 | 10 | 5 | 10 | 10 | 16 |

The PTM 220 receives the SUSI 710 notification. The PTM 220 interprets the SUSI 710 and determines that the SOC 110 and storage device may need and/or benefit from more power. The PTM 220 allocates more power to the SOC 110 and display control and boosts the performance state of the storage device, while reducing power for camera and WiFi modules, for example. Resulting movie playback quality is improved.

Thus, certain examples provide improved overall system performance. Certain examples facilitate improved benchmark results. Certain examples facilitate delivery of a better usage experience to users of the platform 100, 300.

While example implementations of the systems 100, 300, the processor or system-on-a-chip 110, the operating system 130, the rebalancer 140, the rest-of-platform 210, and the power and thermal manager 220 are illustrated in FIGS. 1-8, one or more of the elements, processes and/or devices illustrated in FIGS. 1-8 may be combined, divided, re-arranged, omitted, eliminated and/or implemented in any other way. Further, the example processor/SOC 110, sub-systems 120, 125, OS 130, rebalancer 140, ROP 210, PTM 220, memory 310, thermal sensor(s) 320, power sensor(s) 330, cooling device 340, application monitor 410, processor usage monitor 420, power monitor 430, index generator 440, index comparator 450, rebalancer initiator 510, resource database 520, resource allocator 530, SUSI 710, telemetry 720, foreground applications 802, background processes 804, application profile database 806, index values 810-820, and telemetry data 830-840, and/or, more generally, the example systems 100, 300 of FIGS. 1-8 can be implemented by hardware, software, firmware and/or any combination of hardware, software and/or firmware. Thus, for example, any of the example processor/SOC 110, subsystems 120, 125, OS 130, rebalancer 140, ROP 210, PTM 220, memory 310, thermal sensor(s) 320, power sensor(s) 330, cooling device 340, application monitor 410, processor usage monitor 420, power monitor 430, index generator 440, index comparator 450, rebalancer initiator 510, resource database 520, resource allocator 530, SUSI 710, telemetry 720, foreground applications 802, background processes 804, application profile database 806, index values 810-820, and telemetry data 830-840, and/or, more generally, the example systems 100, 300 of FIGS. 1-8 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example processor/SOC 110, subsystems 120, 125, OS 130, rebalancer 140, ROP 210, PTM 220, memory 310, thermal sensor(s) 320, power sensor(s) 330, cooling device 340, application monitor 410, processor usage monitor 420, power monitor 430, index generator 440, index comparator 450, rebalancer initiator 510, resource database 520, resource allocator 530, SUSI 710, telemetry 720, foreground applications 802, background processes 804, application profile database 806, index values 810-820, and telemetry data 830-840, and/or, more generally, the example systems 100, 300 of FIGS. 1-8 is/are hereby expressly defined to include a tangible computer readable storage device or storage disk such as a memory (e.g., a read only memory (ROM), hard drive, flash memory, other volatile and/or non-volatile memory, etc.), a digital versatile disk (DVD), a compact disk (CD), a Blu-ray disk, etc. storing the software and/or firmware. Further still, the example systems of FIGS. 1-8 may include one or more elements, processes and/or devices in addition to, or instead of, those illustrated in FIGS. 1-8, and/or may include more than one of any or all of the illustrated elements, processes and devices.

Figure 9:
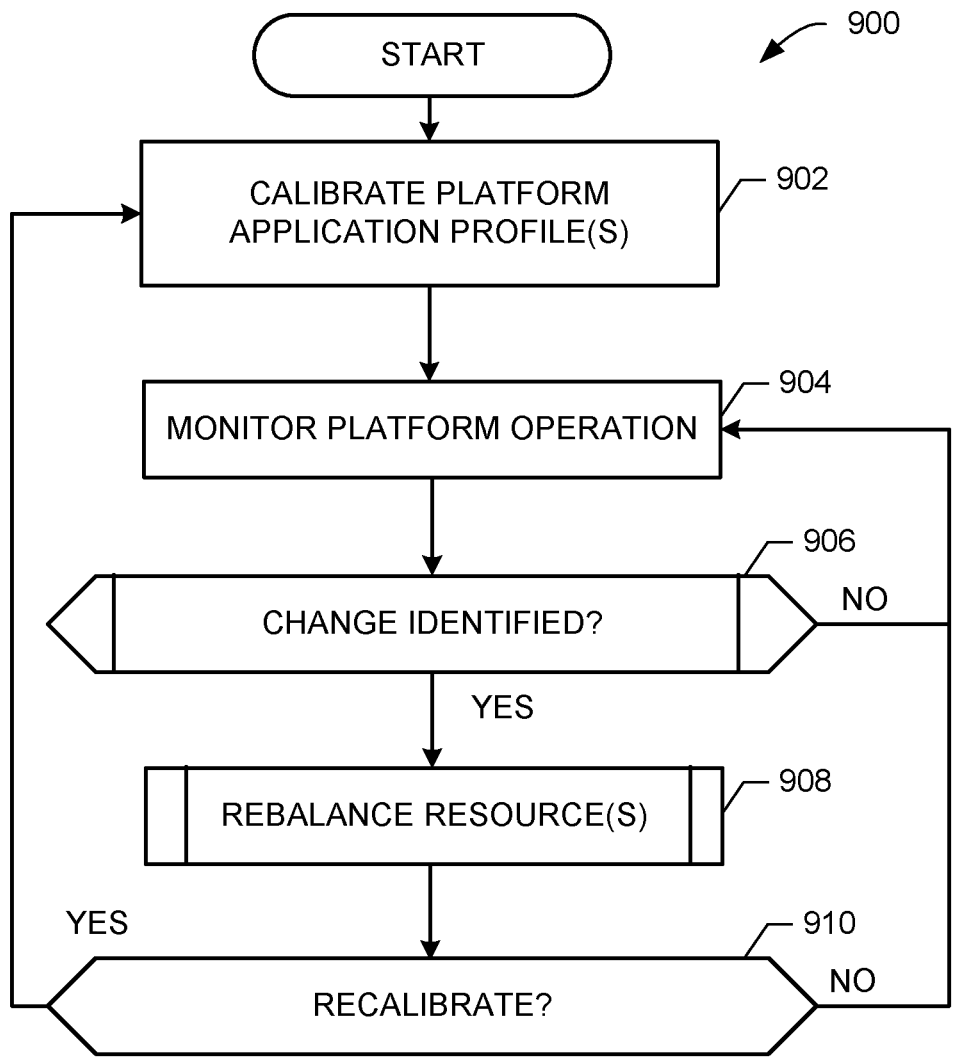
FIGS. 9-11 are flowcharts representative of example machine readable instructions that may be executed to implement the example systems of FIGS. 1-7.
Figure 10:
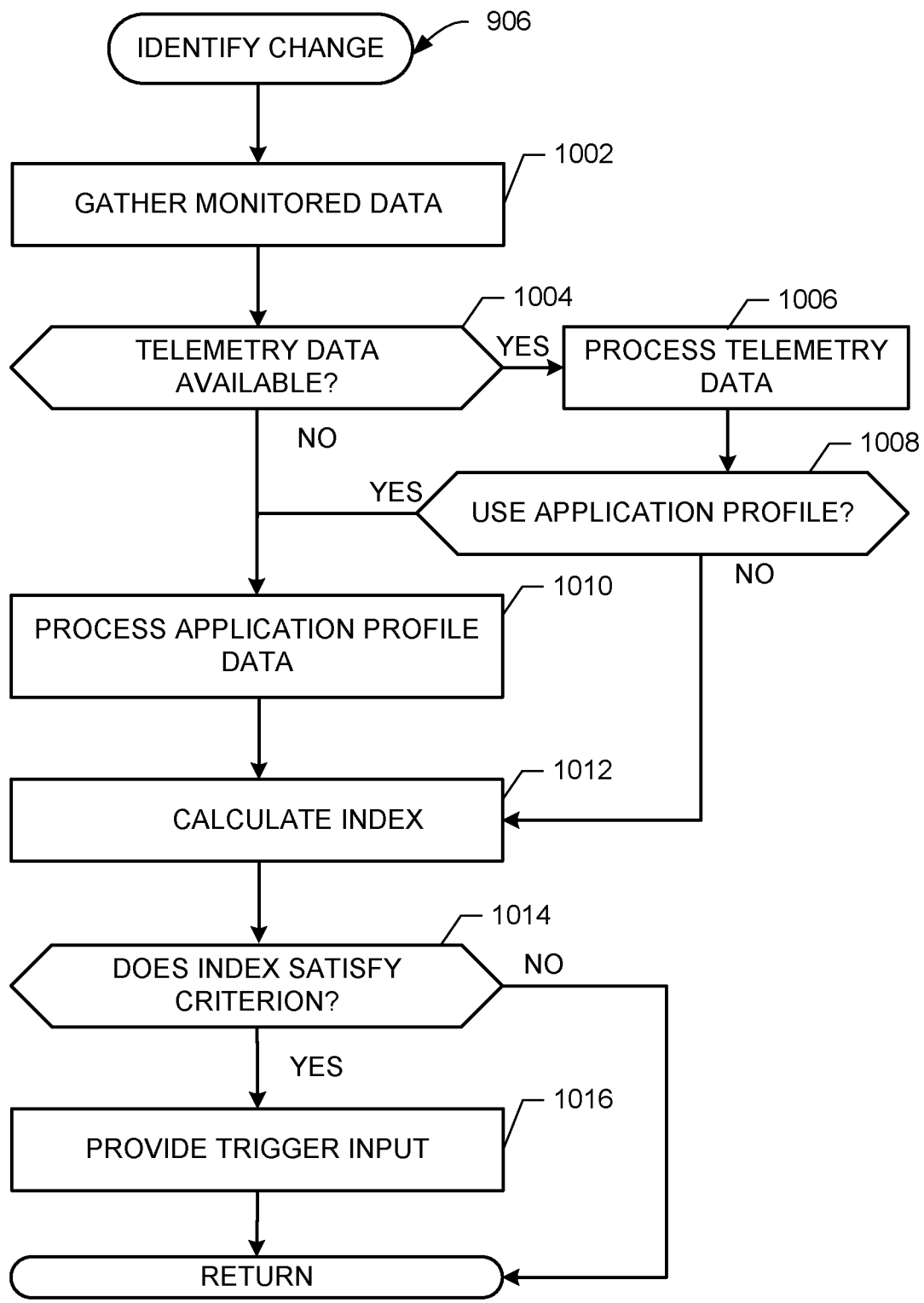
Figure 11:
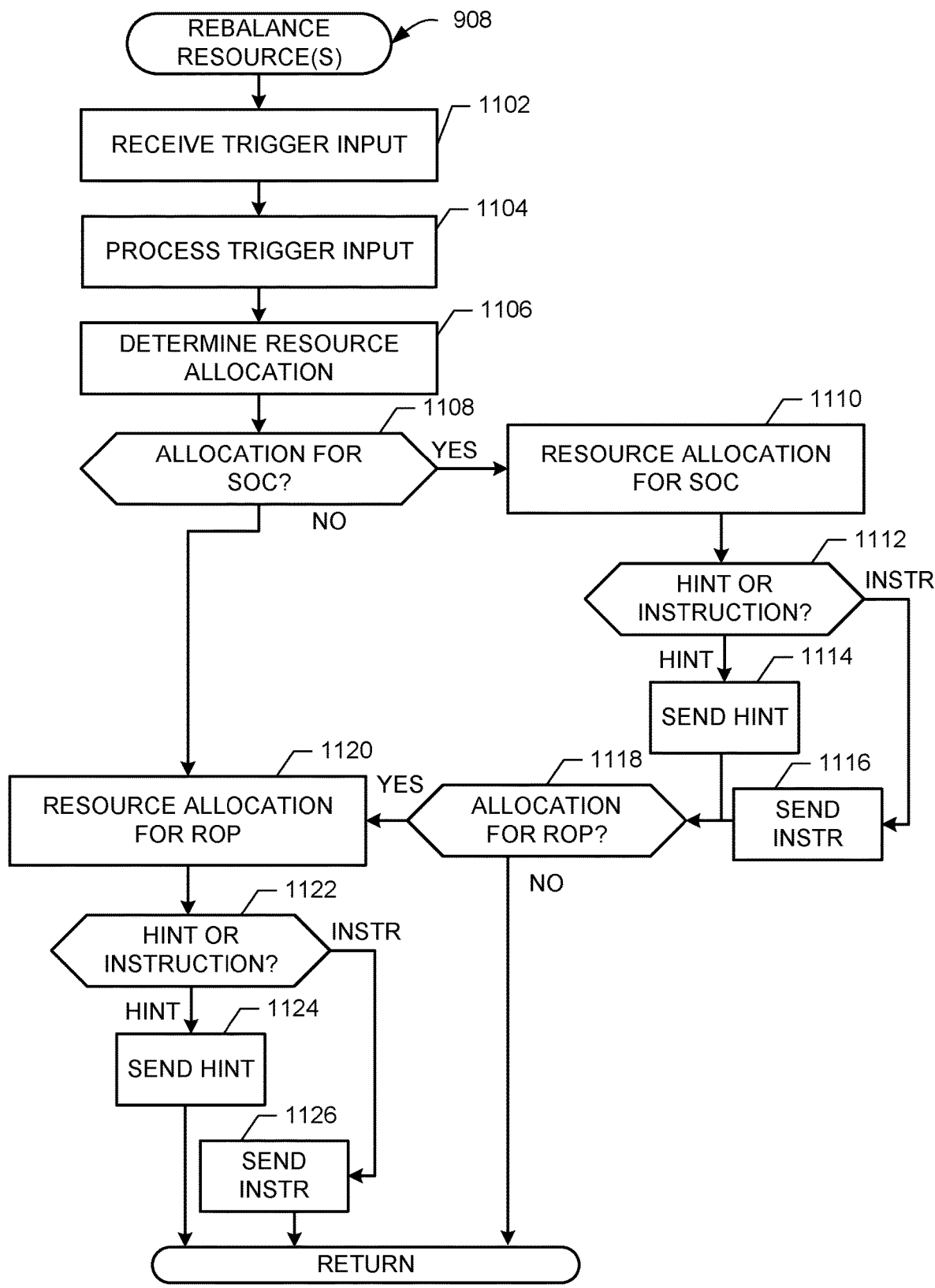

Flowcharts representative of example machine readable instructions for implementing the systems 100 and/or 300 of FIGS. 1-8 are shown in FIGS. 9-11. In these examples, the machine readable instructions comprise a program for execution by a processor such as the processor 1212 shown in the example processor platform 1200 discussed below in connection with FIG. 12. The program may be embodied in software stored on a tangible computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example programs are described with reference to the flowcharts illustrated in FIGS. 9-11, many other methods of implementing the example systems 100 and/or 300 may alternatively be used. For example, the order of execution of the blocks may be changed, and/or some of the blocks described may be changed, eliminated, or combined.

As mentioned above, the example processes of FIGS. 9-11 may be implemented using coded instructions (e.g., computer and/or machine readable instructions) stored on a tangible computer readable storage medium such as a hard disk drive, a flash memory, a ROM, a CD, a DVD, a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 9-11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program 900 of FIG. 9 begins at block 902. At block 902, the platform 100, 300 is calibrated. For example, one or more application profiles are generated (e.g., by the OS 130) based on preset and/or dynamic application execution information and stored in the application profile database 806. In certain examples, subsystem 120, 125 and associated telemetry information can be calibrated with the OS 130 to help ensure accurate and complete monitoring and processing during system operation. In certain examples, a gaming profile/mode, a teleconference profile/mode, etc., can be calibrated and saved for use in rebalancing resources on the platform 100, 300 during particular use(s).

At block 904, operation of the platform 100, 300 is monitored. For example, the OS 130 and its application monitor 410 monitor execution of foreground application(s), background process(es), and/or other platform 100, 300 operation.

At block 906, platform 100, 300 operation is evaluated to identify a change. For example, a scenario index (e.g., SUSI 710, etc.) and/or other individual index value(s) can be computed (e.g., by the index generator 440) from the monitored operation of the platform 100, 300. The index(es) can then be evaluated (e.g., by the index comparator 450) to determine a change in platform 100, 300 operation. The change in operation can be compared to one or more criterion including a threshold, range, delta, etc., and, if the change meets (or does not meet) one or more criterion, a change is triggered. If no change is detected or the change does not satisfy the one or more criterion, operation returns to block 904 to continue monitoring platform 100, 300 operation.

At block 908, a rebalancing of platform 100, 300 resources is triggered. Based on a trigger input (e.g., a scenario index such as the SUSI 710, OS telemetry data 720, application profile data 806, etc.) (e.g., provided to the rebalancer initiator 510), resource settings for components of the platform 100, 300 (e.g., the SOC 110 and ROP 210 and/or individual components such as the processor 110, subsystem(s) 120, 125, etc.) are reallocated and/or otherwise rebalanced (e.g., by the resource allocator 530 of the rebalancer 140), for example.

At block 910, recalibration is evaluated. For example, if operation of the platform 100, 300 has changed such that the operation is dramatically different from the initial calibration, then control reverts to block 902 to recalibrate the platform 100, 300 (e.g., new application installed, new mode entered, new hardware added, etc.). If recalibration is not warranted, then control returns to block 904 to monitor platform 100, 300 operation.

Additional detail associated with identifying a change in platform 100, 300 operation (block 906) is shown in the example of FIG. 10. At block 1002 in the illustrated example of FIG. 10, monitored data is gathered (e.g., by the application monitor 410, processor usage monitor 420, power monitor 430, subsystem 120, 125, etc.). At block 1004, the data is evaluated to determine whether OS telemetry data 720 is available. If telemetry data 720 is available, then, at block 1006, the telemetry data 720 is processed. At block 1008, a system configuration is examined to determine whether application profile data (e.g., from the application monitor 410 and/or the application profile database 806, etc.) is to be used. Thus, OS telemetry data and/or application profile information can be used.

If application profile information is to be used, then, at block 1010, the application profile data is processed. For example, predetermined application profile(s) can be retrieved from the database 806 based on foreground and/or background applications, processes, etc., executing on the SOC 110 and/or the ROP 210 and processed via the OS 130.

At block 1012, the system usage scenario index (SUSI) 710 is calculated (e.g., by the index generator 440) based on the telemetry and/or application data. For example, a scenario index (e.g., SUSI 710, etc.) and/or other individual sub-index value(s) can be computed from the monitored operation of the platform 100, 300. Individual index bit values (e.g., 2 bit, 4 bit, 8 bit, etc.) can be used to represent an absolute or relative usage value (e.g., an 80% usage is represented in an index value with a maximum of 10 as a value of 8, etc.) for a subsystem 120, 125 and/or other platform component (e.g., processor 110, etc.). The individual sub-index values can be concatenated and/or otherwise combined to form the composite scenario/usage index, such as the SUSI 710, via the index generator 440.

At block 1014, the index is evaluated (e.g., by the index comparator 450) to determine whether it satisfies one or more criterion provided by the OS 130, PTM 220, etc. For example, the SUSI 710 can be compared to one or more criterion including a threshold, range, delta, etc., and, at block 1016, if the change meets (or does not meet) one or more criterion, a change is triggered (e.g., by the index comparator 450). If no change is detected or the change does not satisfy the one or more criterion, operation returns to block 904 to continue monitoring platform 100, 300 operation.

Additional detail associated with rebalancing the platform 100, 300 (block 908) is shown in the example of FIG. 11. At block 1102 in the illustrated example of FIG. 11, the trigger input is received (e.g., at the rebalance initiator 510 from the index comparator 450). The trigger input includes an indication of change prompting a rebalancing and/or the scenario index (e.g., SUSI 710). At block 1104, the received trigger input is processed. For example, the SUSI 710 of the trigger input is identified and divided by the rebalance initiator 510 into its constituent sub-index values.

At block 1106, a resource allocation is determined by the resource allocator 530 based on the combination of values from the SUSI 710. For example, the resource allocator 530 processes the combination of values, alone or in conjunction with database 520 information, to determine an operating state or usage scenario of the platform 100, 300 and its attributes for resource rebalancing/reallocation. Based on the trigger input (e.g., a scenario index such as the SUSI 710, OS telemetry data 720, application profile data 806, etc.), resource settings for components of the platform 100, 300 (e.g., the SOC 110 and ROP 210 and/or individual components such as the processor 110, subsystem(s) 120, 125, etc.) are determined for reallocation/rebalancing, for example.

At block 1108, the platform 100, 300 is reviewed to determine whether a resource allocation for the SOC 110 is provided in the rebalancing by the resource allocator 530. If an allocation is provided for the SOC 110, then, at block 1110, that resource allocation/rebalancing is determined for the SOC 110. For example, processor 110 power level, cooling, etc., can be adjusted in the rebalancing by the resource allocator 530. At block 1112, the rebalancing and SOC 110 are evaluated to determine whether the resource allocation is to be provided as a hint or as an instruction. If the allocation is provided as a hint, then, at block 1114, the allocation is provided as a hint or suggestion to the SOC 110. For example, if the resource allocator 530 can suggest a rebalancing but cannot instruct the rebalancing to occur, a hint of the rebalancing can be provided to the SOC 110 to allow the SOC to make a decision regarding rebalancing. However, if the allocation is provided as an instruction, then, at block 1116, the instruction for rebalancing is sent to the SOC 110.

At block 1118, the platform 100, 300 is reviewed to determine whether a resource allocation for the ROP 210 is provided in the rebalancing by the resource allocator 530. If an allocation is provided for the ROP 210, then, at block 1120, that resource allocation/rebalancing is determined for the ROP 210. For example, subsystem 120, 125 power level, cooling, etc., can be adjusted in the rebalancing by the resource allocator 530. At block 1122, the rebalancing and ROP 210 are evaluated to determine whether the resource allocation is to be provided as a hint or as an instruction. If the allocation is provided as a hint, then, at block 1124, the allocation is provided as a hint or suggestion to the ROP 210. For example, if the resource allocator 530 can suggest a rebalancing but cannot instruct the rebalancing to occur, a hint of the rebalancing can be provided to the ROP 210 to allow the ROP 210 to make a decision regarding rebalancing. However, if the allocation is provided as an instruction, then, at block 1126, the instruction for rebalancing is sent to the ROP 210. Control then returns to block 910 of the example of FIG. 9, for example.

Figure 12:
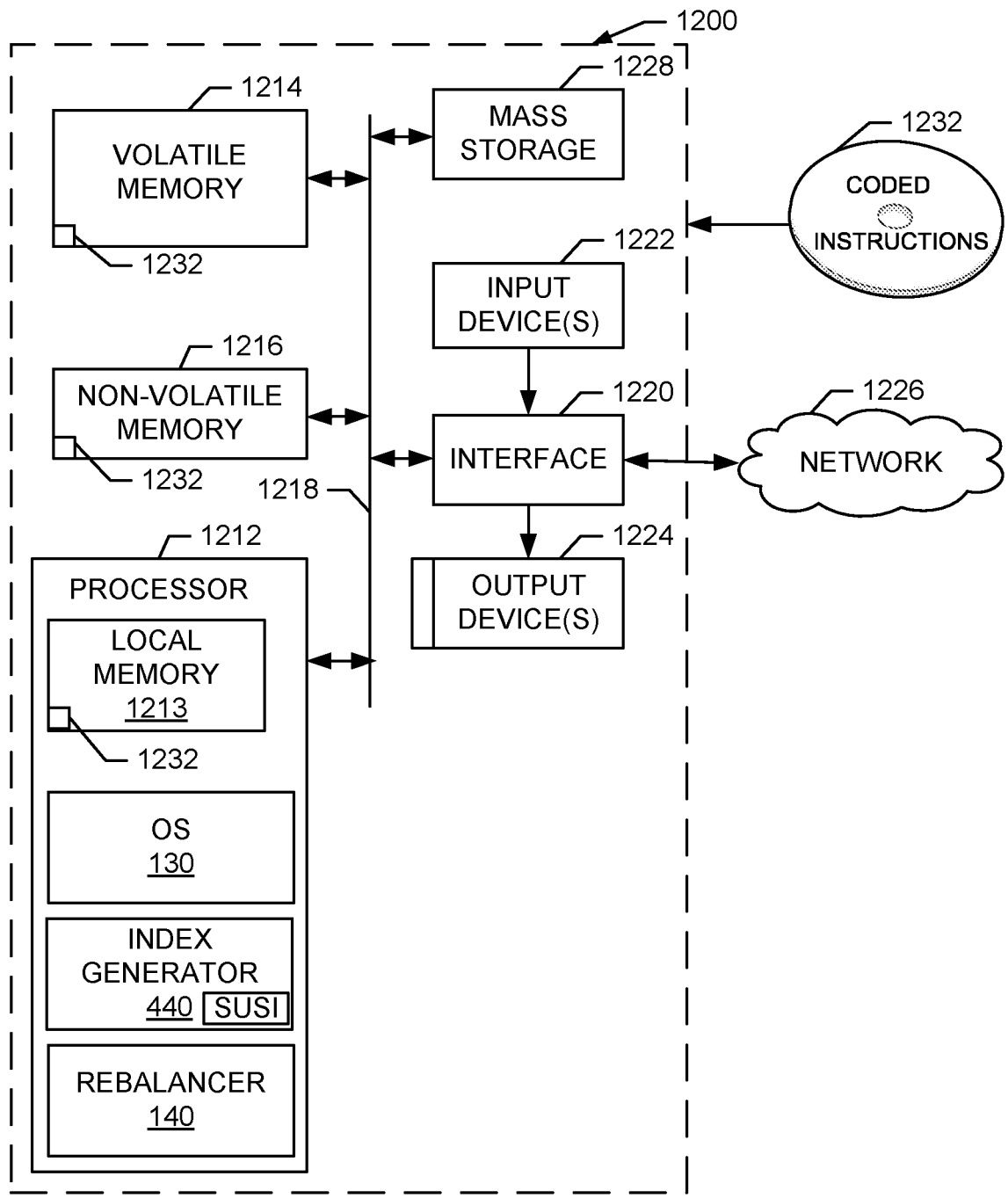
FIG. 12 is a schematic illustration of an example processor platform that may execute the instructions of FIGS. 9-11 to implement the example systems of FIGS. 1-8.

FIG. 12 is a block diagram of an example processor platform 1200 capable of executing the instructions of FIGS. 9-11 to implement the systems of FIGS. 1-8. The processor platform 1200 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer. In the illustrated example, the processor 1212 is structured to include the example OS 130, rebalancer 140, etc.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a peripheral component interconnect (PCI) express interface.

In the illustrated example, one or more input devices 1222 are connected to the interface circuit 1220. The input device(s) 1222 permit(s) a user to enter data and commands into the processor 1212. The input device(s) 1222 can be implemented by, for example, an audio sensor, a microphone, a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

The coded instructions 1232 of FIGS. 9-11 may be stored in the mass storage device 1228, in the volatile memory 1214, in the non-volatile memory 1216, and/or on a removable tangible computer readable storage medium such as a CD or DVD.

From the foregoing, it will be appreciated that the above disclosed methods, apparatus and articles of manufacture facilitate monitoring and management of resource usage in a computing platform. In certain examples, rather than focusing on the processor (e.g., the SOC), the whole computing platform (e.g., the ROP) is monitored and managed for resource rebalancing based on the current snapshot of system usage (e.g., the system usage scenario quantified by the system usage scenario index or SUSI). Certain examples facilitate dynamic adjustment of power and/or other system resources based on a change in usage scenario (e.g., a change that exceeds a threshold, etc.).

Example 1 is an apparatus including a processor and a subsystem. The processor includes a modified operating system, the operating system modified to monitor application execution via the processor to determine a usage scenario for the apparatus. The processor includes an index generator to generate a system usage scenario index representative of the usage scenario for the processor and the subsystem of the apparatus. The processor includes a rebalancer to reallocate resources of at least one of the processor or the subsystem based on the system usage scenario index.

Example 2 includes the subject matter of example 1, wherein the processor implements a power and thermal management device.

Example 3 includes the subject matter of example 1, wherein the index generator is implemented as part of the modified operating system.

Example 4 includes the subject matter of example 1, wherein the apparatus is implemented on a platform including a system-on-a-chip (SOC) and a rest-of-the-platform (ROP), the processor included in the SOC and the subsystem included in the ROP.

Example 5 includes the subject matter of example 4, wherein at least one resource is rebalanced between the SOC and the ROP.

Example 6 includes the subject matter of example 1, wherein the rebalancer is to reallocate resources via at least one of an instruction or a suggestion to at least one of the processor or the subsystem.

Example 7 includes the subject matter of example 1, wherein the subsystem includes at least one of a camera subsystem, a wireless communication subsystem, a storage subsystem, a display subsystem, a modem subsystem, or a graphics processing subsystem.

Example 8 includes the subject matter of example 1, wherein the system usage scenario index is a composite index formed from a sub-index associated with each of the processor and the subsystem.

Example 9 includes the subject matter of example 1, wherein the usage scenario is to be determined based on at least one of application information or telemetry data.

Example 10 includes the subject matter of example 9, wherein the application information is based on one or more application profiles formed from execution of foreground applications and background processes.

Example 11 includes the subject matter of example 9, wherein the telemetry data includes resource usage data monitored by the modified operating system.

Example 12 includes the subject matter of example 1, wherein the modified operating system further includes a processor usage monitor to monitor usage of the processor and a power monitor to monitor power consumption by at least one of the processor or the subsystem.

Example 13 includes the subject matter of example 1, further including an index comparator to compare the system usage scenario index to a criterion, the index comparator to provide a trigger input to the rebalancer based on the comparison of the system usage scenario index to the criterion.

Example 14 includes the subject matter of example 1, wherein the reallocated resources include power.

Example 15 is a method of usage scenario based monitoring and adjustment of a computing platform including a processor and a subsystem. The method includes monitoring, using the processor and a modified operating system executing on the processor, application execution via the processor and the modified operating system to determine a usage scenario for the computing platform. The method includes generating a system usage scenario index representative of the usage scenario for the processor and the subsystem of the computing platform. The method includes reallocating, based on the system usage scenario index, resources of at least one of the processor or the subsystem.

Example 16 includes the subject matter of example 15, wherein the processor implements a power and thermal management device.

Example 17 includes the subject matter of example 15, wherein the platform includes a system-on-a-chip (SOC) and a rest-of-the-platform (ROP), and wherein the processor is included in the SOC and the subsystem is included in the ROP.

Example 18 includes the subject matter of example 17, wherein at least one resource is rebalanced between the SOC and the ROP.

Example 19 includes the subject matter of example 15, wherein reallocating further includes reallocating resources via at least one of an instruction or a suggestion to at least one of the processor or the subsystem.

Example 20 includes the subject matter of example 15, wherein the subsystem includes at least one of a camera subsystem, a wireless communication subsystem, a storage subsystem, a display subsystem, a modem subsystem, or a graphics processing subsystem.

Example 21 includes the subject matter of example 15, wherein the system usage scenario index is a composite index formed from a sub-index associated with each of the processor and the subsystem.

Example 22 includes the subject matter of example 15, wherein the usage scenario is to be determined based on at least one of application information or telemetry data.

Example 23 includes the subject matter of example 22, wherein the application information is based on one or more application profiles formed from execution of foreground applications and background processes.

Example 24 includes the subject matter of example 23, further including calibrating the computing platform to generate the one or more application profiles.

Example 25 includes the subject matter of example 22, wherein the telemetry data includes resource usage data monitored by the modified operating system.

Example 26 includes the subject matter of example 15, further including monitoring usage of the processor and monitoring power consumption by at least one of the processor or the subsystem to determine the usage scenario.

Example 27 includes the subject matter of example 15, further including: comparing the system usage scenario index to a criterion; and providing a trigger input to the rebalancer based on the comparison of the system usage scenario index to the criterion.

Example 28 includes the subject matter of example 15, wherein the resources include power.

Example 29 is a tangible computer readable storage medium comprising computer readable instructions which, when executed, cause a processor to at least: monitor, using the processor and a modified operating system executing on the processor, application execution via the processor and the modified operating system to determine a usage scenario for a computing platform, the computing platform including the processor and a subsystem; generate a system usage scenario index representative of the usage scenario for the processor and the subsystem of the computing platform; and reallocate, based on the system usage scenario index, resources of at least one of the processor or the subsystem.

Example 30 includes the subject matter of example 29, wherein the processor implements a power and thermal management device.

Example 31 includes the subject matter of example 29, wherein the platform includes a system-on-a-chip (SOC) and a rest-of-the-platform (ROP), and wherein the processor is included in the SOC and the subsystem is included in the ROP.

Example 32 includes the subject matter of example 31, wherein at least one resource is rebalanced between the SOC and the ROP.

Example 33 includes the subject matter of example 29, wherein reallocating further includes reallocating resources via at least one of an instruction or a suggestion to at least one of the processor or the subsystem.

Example 34 includes the subject matter of example 29, wherein the subsystem includes at least one of a camera subsystem, a wireless communication subsystem, a storage subsystem, a display subsystem, a modem subsystem, or a graphics processing subsystem.

Example 35 includes the subject matter of example 29, wherein the system usage scenario index is a composite index formed from a sub-index associated with each of the processor and the subsystem.

Example 36 includes the subject matter of example 29, wherein the usage scenario is to be determined based on at least one of application information or telemetry data.

Example 37 includes the subject matter of example 36, wherein the application information is based on one or more application profiles formed from execution of foreground applications and background processes.

Example 38 includes the subject matter of example 37, wherein the instructions, when executed, further cause the processor to calibrate the computing platform to generate the one or more application profiles.

Example 39 includes the subject matter of example 36, wherein the telemetry data includes resource usage data monitored by the modified operating system.

Example 40 includes the subject matter of example 29, wherein the instructions, when executed, further cause the processor to monitor usage of the processor and monitoring power consumption by at least one of the processor or the subsystem to determine the usage scenario.

Example 41 includes the subject matter of example 29, further cause the processor to: comparing the system usage scenario index to a criterion; and providing a trigger input to the rebalancer based on the comparison of the system usage scenario index to the criterion.

Example 42 includes the subject matter of example 29, wherein the resources include power.

Example 43 includes the subject matter of any of examples 29-42, wherein the modified operating system is to implement an index generator to generate a system usage scenario index.

Example 44 is an apparatus including a monitoring means to monitor application execution to determine a usage scenario for a computing platform, the computing platform including a processor and a subsystem. The apparatus includes an index generating means to generate a system usage scenario index representative of the usage scenario for the processor and the subsystem of the computing platform. The apparatus includes a rebalancing means to, based on the system usage scenario index, reallocate resources of at least one of the processor or the subsystem.

Example 45 is an apparatus including a processor and a subsystem. The processor includes a modified operating system, the operating system modified to monitor application execution via the processor to determine a usage scenario for the apparatus and to generate a system usage scenario index representative of the usage scenario for the processor and the subsystem of the apparatus. The processor includes a rebalancer to reallocate resources of at least one of the processor or the subsystem based on the system usage scenario index.

Example 46 is a power and thermal management system including a processor. The processor includes an index generator to generate a system usage scenario index representative of a usage scenario for the processor and a subsystem in communication with the processor, the usage scenario based on monitoring information obtained from an operating system. The processor includes a rebalancer to reallocate resources of at least one of the processor or the subsystem based on the system usage scenario index.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   memory including instructions; and
   a processor to execute the instructions to:
   generate a system usage scenario representative of usage of the processor and a subsystem in communication with the processor, the usage based on operating system monitoring information and the system usage scenario associated with a system usage scenario index; and
   reallocate resources of at least one of the processor or the subsystem based on the system usage scenario.

2. The apparatus of claim 1, wherein the processor is to implement power and thermal management.

3. The apparatus of claim 1, wherein the apparatus is implemented on a platform including a system-on-a-chip (SOC) and a rest-of-the-platform (ROP), the processor included in the SOC and the subsystem included in the ROP.

4. The apparatus of claim 3, wherein at least one resource is rebalanced between the SOC and the ROP.

5. The apparatus of claim 1, wherein the processor is to reallocate resources via at least one of an instruction or a suggestion to at least one of the processor or the subsystem.

6. The apparatus of claim 1, wherein the system usage scenario index is a composite index formed from a sub-index associated with each of the processor and the subsystem.

7. The apparatus of claim 1, wherein the usage is to be determined based on at least one of application information or telemetry data.

8. The apparatus of claim 7, wherein the application information is based on one or more application profiles formed from execution of foreground applications and background processes.

9. The apparatus of claim 7, wherein the telemetry data includes resource usage data monitored by the operating system.

10. The apparatus of claim 1, further including a processor usage monitor to monitor usage of the processor and a power monitor to monitor power consumption by at least one of the processor or the subsystem.

11. The apparatus of claim 1, wherein the processor is to:
    compare the system usage scenario to a criterion; and
    trigger the reallocating based on the comparison of the system usage scenario to the criterion.

12. A tangible computer readable storage medium comprising instructions that, when executed, cause a processor to at least:
    generate a system usage scenario representative of usage of the processor and a subsystem in communication with the processor, the usage based on operating system monitoring information and the system usage scenario associated with a system usage scenario index; and
    reallocate resources of at least one of the processor or the subsystem based on the system usage scenario.

13. The computer readable storage medium of claim 12, wherein the processor is included in a system-on-a-chip (SOC) and the subsystem is included in a rest-of-the-platform (ROP), the SOC and the ROP forming a platform, and wherein the instructions, when executed, cause the processor to rebalance at least one resource between the SOC and the ROP.

14. The computer readable storage medium of claim 12, wherein the instructions, when executed, cause the processor to reallocate resources via at least one of an instruction or a suggestion to at least one of the processor or the subsystem.

15. The computer readable storage medium of claim 12, wherein the system usage scenario index is a composite index formed from a sub-index associated with each of the processor and the subsystem, and wherein the instructions, when executed, cause the processor to determine the usage based on at least one of application information or telemetry data.

16. The computer readable storage medium of claim 12, wherein the instructions, when executed, cause the processor to monitor the usage of the processor and power consumption by at least one of the processor or the subsystem.

17. The computer readable storage medium of claim 12, wherein the instructions, when executed, cause the processor to compare the system usage scenario to a criterion and to provide a trigger input to reallocate resources based on the comparison of the system usage scenario to the criterion.

18. A method comprising:
    generating, by executing an instruction using a processor, a system usage scenario representative of usage of the processor and a subsystem in communication with the processor, the usage based on operating system monitoring information and the system usage scenario associated with a system usage scenario index; and reallocating, by executing an instruction using the processor, resources of at least one of the processor or the subsystem based on the system usage scenario.

19. The method of claim 18, further including:
comparing the system usage scenario to a criterion; and
triggering the reallocating based on the comparison of the system usage scenario to the criterion.

20. A platform apparatus comprising:
a rest-of-the-platform (ROP) including a subsystem; and
a system-on-a-chip (SOC) including:
  memory including instructions; and
  a processor to execute the instructions to:
    generate a system usage scenario representative of usage of the processor and the subsystem in communication with the processor, the usage based on operating system monitoring information; and
    reallocate resources of at least one of the processor or the subsystem based on the system usage scenario.

21. A tangible computer readable storage medium comprising instructions that, when executed, cause a processor to at least:
generate a system usage scenario representative of usage of the processor and a subsystem in communication with the processor, the usage based on operating system monitoring information; and
reallocate resources of at least one of the processor or the subsystem based on the system usage scenario via at least one of an instruction or a suggestion to at least one of the processor or the subsystem.

* * * * *